J. BULL.

Gate-Latches.

No. 5,668. Reissued Nov. 25, 1873.

WITNESSES,

Thomas Houghton.

Geo. A. Morse

INVENTOR,

James Bull.

by his Att'y

James A. Shilton.

AM. PHOTO-LITHOGRAPHIC Co. N.Y. (OSBORNE'S PROCESS)

UNITED STATES PATENT OFFICE.

JAMES BULL, OF GALESBURG, ILLINOIS, ASSIGNOR TO VAN WAGONER & WILLIAMS, OF NEW YORK.

IMPROVEMENT IN GATE-LATCHES.

Specification forming part of Letters Patent No. 71,694, dated December 3, 1867; reissue No. 5,668, dated November 25, 1873; application filed July 25, 1873.

*To all whom it may concern:*

Be it known that I, JAMES BULL, of Galesburg, in the county of Knox and State of Illinois, have invented certain Improvements in Gate-Fastenings, of which the following is a specification:

My invention relates, generally, to gate-fastenings, operating to engage or disengage in either direction, at will, and arranged to be attached to the adjacent faces of the gate-post and gate-stile. It consists, first, in a double latch or catch, provided with a dovetail recess, located on the side of the latch, along which the detaining stop, stud, or pin passes, and between the frictional surfaces over which it passes to engage the same, and in which the two ends of the latch act as the sole counter-balance each to the other; second, in a double latch or catch, provided with a dovetail recess, located on the side of the latch, along which the detaining stop, stud, or pin passes, and between the frictional surfaces over which it passes to engage the same, in combination with a detaining stop, stud, or pin, so arranged that when the parts are approached from either side engagement must take place, and continue until intentionally released, such detaining-stop being so broad as to barely enter and nearly fill the recess when engaged, and beveled on the sides; third, in the double catch or latch above described, having its vibrations limited by stops on each side within the quadrant of a circle; fourth, in the double catch or latch above described, attached to a latch-plate, provided with protecting projections on either side of the latch-plate, arranged so as to guard the catch from injury by rough treatment; fifth, in the double latch above described, secured to the latch-plate by a single pivot-screw.

Figure 1:
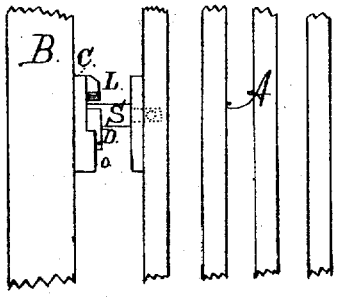
Figure 2:
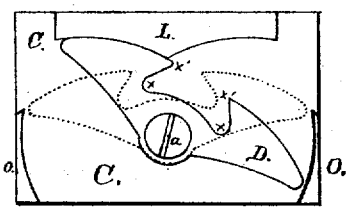

C is the latch-plate; D, the double latch or catch, provided with a dovetail recess, indicated by the letters *x* and *x*. L is the projection, placed on the plate C in a position to detain the latch or catch D; *a*, the pivot-screw which secures the latch to the plate; and S, the stud, stop, or pin. (See Figures 1 and 2 of the drawings.) *o o* are the protecting projections of the plate. The stud or stop S corresponds in form to the beveled sides of the dovetail recess of the latch D, so as to engage therewith securely, and detain the gate in position. It is made of a suitable size to easily enter and leave the recess when the catch is lifted or depressed, and the gate is closed or shoved from its position, and is preferably broad and flat.

I am aware that a double latch provided with a dovetail recess has been shown in the Letters Patent of H. R. Sloat, dated July 9, 1861; but in that case the counter-balance consisted of a pendent rod or stem of iron, loaded at the end by a lump or mass of metal, extending from the center of the latch in a way to neutralize the two ends of the latch part proper as counter-balances to each other. The stop arrangement in that invention differs from mine, in consisting of two pins, one taking loosely in the slot or recess, and the other taking firmly on the pendent counter-balance in a way to assist the other pin in arresting the gate on its passage.

The operation of my invention is simple and manifest. The two opposite parts—the latch and the stop—are to be placed on the stile and gate-post in such relation as to swing into engagement, as the gate is moved to and fro on its hinges, automatically, and permit disengagement by the manipulation of the latch, when desired. The projection L prevents the catch from moving over more than a quadrant of a circle, thereby causing the latch always to remain within the reach of the swinging stop. The projections *o o* guard the latch.

My claims are—

1. A movable double catch or latch with a dovetail recess located between its two ends, which are provided with frictional surfaces on the dovetail side of the catch, and act each as the sole counter-balance to the other.

2. A movable double catch or latch with a dovetail recess located between its two ends, arranged to operate in connection with, and barely but easily receive, a detaining-stop corresponding in size to the dovetail recess, as set forth.

3. A movable double catch or latch with a dovetail recess located between its two ends, which are provided with frictional surfaces, and act as counter-balances each to the other, and having its vibrations limited by alternate stops within a quadrant of a circle.

4. A movable double catch or latch with a dovetail recess located between its two ends, which are provided with frictional surfaces, and act as sole counter-balances each to the other, and which is secured by a single pivot-screw to the latch-plate.

5. A vibrating double catch or latch with a dovetail recess located between its two ends, which act as counter-balances each to the other, in combination with the protecting projections *o o* on the latch-plate.

JAMES BULL.

Witnesses:
R. A. HEMMENWAY,
O. V. HOWLAND.